US011904448B2

(12) United States Patent
Bralla et al.

(10) Patent No.: US 11,904,448 B2
(45) Date of Patent: Feb. 20, 2024

(54) HAND-HELD POWER TOOL

(71) Applicant: Hilti Aktiengesellschaft, Schaan (LI)

(72) Inventors: Dario Bralla, Buchs (CH); Albert Binder, Buchs (CH); Donato Clausi, Arlesheim (CH); Michael Wierer, Röthis (AT); Serhey Khandozhko, Buchs SG (CH); Nikolaus Hannoschoeck, Grabs (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 17/760,675

(22) PCT Filed: Oct. 7, 2020

(86) PCT No.: PCT/EP2020/078041

§ 371 (c)(1),
(2) Date: Mar. 15, 2022

(87) PCT Pub. No.: WO2021/073960

PCT Pub. Date: Apr. 22, 2021

(65) Prior Publication Data

US 2023/0021949 A1 Jan. 26, 2023

(30) Foreign Application Priority Data

Oct. 17, 2019 (EP) .................................... 19203810

(51) Int. Cl.
*B25D 11/00* (2006.01)
*B25D 11/12* (2006.01)

(52) U.S. Cl.
CPC .......... *B25D 11/125* (2013.01); *B25D 11/005* (2013.01); *B25D 2250/095* (2013.01);
(Continued)

(58) Field of Classification Search
CPC ................ B25D 11/005; B25D 11/125; B25D 2250/095; B25D 2250/131; B25D 2250/201; B25D 2250/221
See application file for complete search history.

(56) References Cited

U.S. PATENT DOCUMENTS 7,204,322 B2 * 4/2007 Sakai .................. B25D 11/125
173/217
8,333,251 B2 * 12/2012 Cecchin .............. B25D 11/005
173/113

(Continued)

FOREIGN PATENT DOCUMENTS

DE 10 2009 045 758 A1 4/2011
DE 20 2011 110 069 U1 2/2013

(Continued)

OTHER PUBLICATIONS

International Searching Authority, International Search Report and Written Opinion in International Application No. PCT/EP2020/078041, dated Dec. 11, 2020.

*Primary Examiner* — Thomas M Wittenschlaeger
*Assistant Examiner* — David G Shutty
(74) *Attorney, Agent, or Firm* — Leydig, Voit & Mayer, Ltd.

(57) ABSTRACT

In a control method for a hand-held power tool, a striking mechanism is driven with an electric motor, wherein an exciter piston of the pneumatic striking mechanism is driven periodically by the electric motor and a striking piston of the striking mechanism is coupled to the exciter piston via a pneumatic chamber. The method includes detecting the acceleration of a machine housing along a striking direction of the striking piston in different phases of the movement of the exciter piston; and controlling a rotational speed of an electric motor according to the detected acceleration in the different phases.

2 Claims, 2 Drawing Sheets

(52) U.S. Cl.
CPC .. *B25D 2250/131* (2013.01); *B25D 2250/201* (2013.01); *B25D 2250/221* (2013.01)

(56) References Cited

U.S. PATENT DOCUMENTS

| | | | | |
|---|---|---|---|---|
| 8,955,615 | B2 * | 2/2015 | John | B25D 17/06 173/206 |
| 10,369,686 | B2 * | 8/2019 | Ontl | F16F 7/104 |
| 2005/0023017 | A1 | 2/2005 | Sakai | |
| 2010/0193205 | A1 | 8/2010 | Cecchin et al. | |
| 2015/0101835 | A1 | 4/2015 | Nitsche et al. | |
| 2015/0158170 | A1 | 6/2015 | Nitsche et al. | |

FOREIGN PATENT DOCUMENTS

| | | | |
|---|---|---|---|
| DE | 10 2012 005 803 | A1 | 9/2013 |
| EP | 1 502 710 | A2 | 2/2005 |

* cited by examiner

HAND-HELD POWER TOOL

CROSS-REFERENCE TO RELATED APPLICATIONS

This patent application is the U.S. National Stage of International Patent Application No. PCT/EP2020/078041, filed Oct. 7, 2020, which claims the benefit of European Patent Application No. 19203810.7, filed Oct. 17, 2019, which are each incorporated by reference.

FIELD OF THE INVENTION

The present invention relates to a chiseling hand-held power tool having a pneumatic impact mechanism.

In a hand-held power tool, a user activates an electric motor by actuating an electric system button. The impact mechanism is activated when the user presses a tool fitted in the hand-held power tool against a substrate. The pressing force on the tool is thus necessary in order to keep the impact mechanism in action. If the pressing force is momentarily insufficient, the impact mechanism switches off. Since, after the impact mechanism has switched off, a slight pressing force reactivates it, this can result in unfavorable repetitive switching on and off.

DISCLOSURE OF THE INVENTION

The control method according to the invention for a hand-held power tool includes the steps of: driving an impact mechanism with an electric motor, wherein an exciter piston of the pneumatic impact mechanism is driven periodically by the electric motor and an impact piston of the impact mechanism is coupled to the exciter piston via a pneumatic chamber. The acceleration of a machine housing is sensed along a striking direction of the impact piston at different phases in the movement of the exciter piston. A rotational speed of an electric motor is regulated depending on the sensed acceleration at the different phases.

The hand-held power tool identifies, on the basis of the sensed accelerations, whether the user is guiding the hand-held power tool in a stable manner or is overstrained. Accordingly, the power output of the hand-held power tool is controlled by means of the rotational speed of the electric motor.

In one configuration, a measure of a pressing force on a tool of the hand-held power tool is estimated on the basis of the acceleration and the phase, and the rotational speed is regulated on the basis of the estimated pressing force.

The hand-held power tool according to the invention has a handle, a machine housing, a tool holder in which a tool is guided along a working axis, and an electric motor for driving an impact mechanism. The pneumatic impact mechanism has an exciter piston coupled to the electric motor, an impact piston, and a pneumatic chamber coupling the exciter piston to the impact piston. An acceleration sensor serves to sense an acceleration along a working axis of the machine housing. A sensor serves to sense a phase of the exciter piston. An evaluation unit serves to determine a pressing force on the tool on the basis of the sensed phase and the sensed acceleration a. A control unit serves to set a rotational speed of the electric motor, wherein the control unit sets a rotational speed in response to a particular pressing force.

BRIEF DESCRIPTION OF THE FIGURES

The following description explains the invention on the basis of exemplary embodiments and figures, in which.

Identical or functionally identical elements are indicated by the same reference signs in the figures, unless stated otherwise.

EMBODIMENTS OF THE INVENTION

Figure 1:
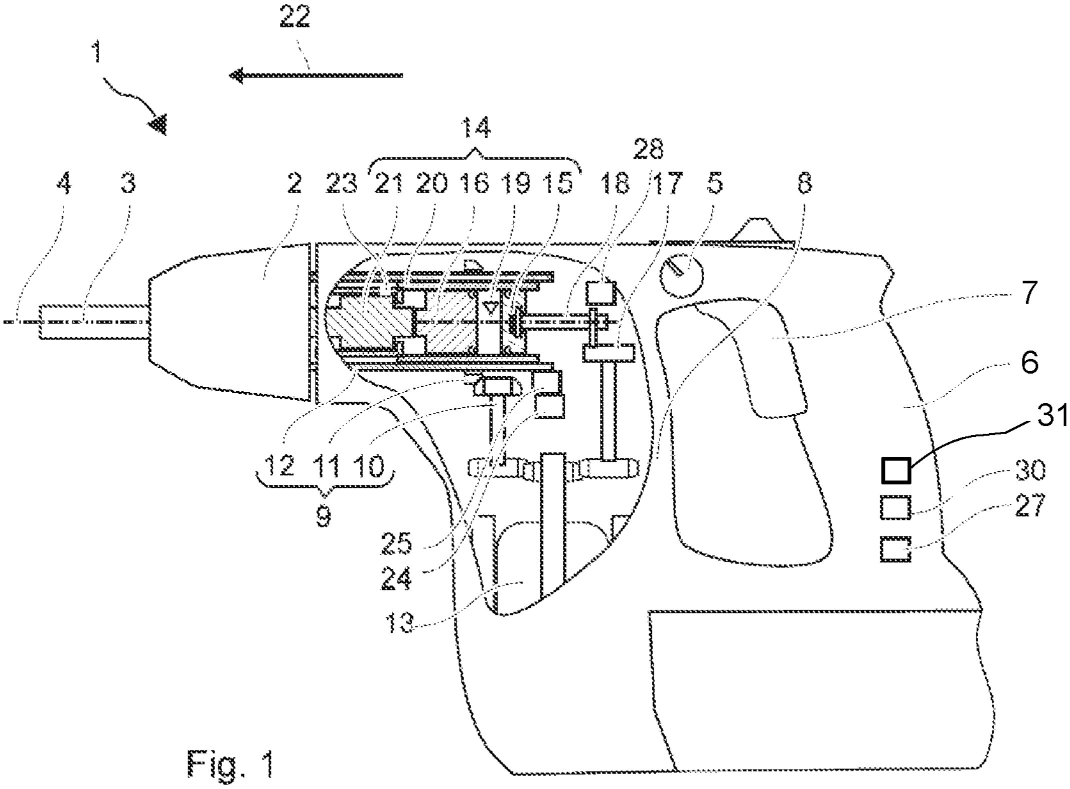
FIG. 1 shows a hammer drill

FIG. 1 schematically shows a hammer drill 1 as an example of a portable hand-held power tool. The illustrative hammer drill 1 has a tool holder 2, into which a tool 3 can be inserted and locked. The tool 3 is for example a drill bit, a chisel etc. The embodiment illustrated by way of example turns the tool holder 2 about a working axis 4 and at the same time exerts periodic impacts on the tool along the working axis 4. The hand-held power tool 1 can have a mode selector switch 5, which allows the user to selectively activate and deactivate the rotational movement and selectively activate and deactivate the percussive operation.

The hand-held power tool 1 has a handle 6. The user can hold and guide the hand-held power tool 1 during operation by way of the handle 6. The operating button 7 is preferably attached to the handle 6 in such a way that the user can operate the operating button 7 using the hand holding the handle 6. The handle 6 can be decoupled from a machine housing 8 by way of damping elements. The hand-held power tool 1 is switched on and off by the operating button 7. The operating button 7 is arranged in the handle 6. The user can actuate the operating button 7 preferably using the hand holding the handle 6.

The hand-held power tool 1 has a rotary drive 9, which is coupled to the tool holder 2. Among other things, the rotary drive 9 can have a step-down gear mechanism 10 and a slip clutch 11. An output shaft 12 of the rotary drive 9 is connected to the tool holder 2. The rotary drive 9 is coupled to an electric motor 13. The user can switch the electric motor 13 on and off by actuating the operating button 7, wherein the operating button 7 accordingly controls a power supply to the electric motor 13. In one embodiment, a rotational speed of the electric motor 13 can be set by way of the operating button 7.

The hand-held power tool 1 has a pneumatic impact mechanism 14. The pneumatic impact mechanism 14 has an exciter piston 15 and an impact piston 16. The exciter piston 15 is permanently coupled to the electric motor 13. Since the exciter piston 15 is permanently coupled to the electric motor 13, the exciter piston 15 moves as soon as the electric motor 13 rotates, i.e. when the user actuates the operating button 7. The ratio of the rotational speed of the electric motor 13 to the periodicity of the movement of the exciter piston 15 is predefined by the transmission components in the drive train between electric motor 13 and exciter piston 15. Examples of transmission components are an eccentric wheel 17 and a connecting rod 18, which convert the rotational movement of the electric motor 13 into a movement in translation on the working axis 4. The exciter piston 15 and the impact piston 16 close off a pneumatic chamber 19 between one another. In the illustrated embodiment, radial closure of the pneumatic chamber 19 is provided by a guide tube 20, which at the same time guides the exciter piston 15 and the impact piston. In other embodiments, the impact piston can be of hollow design and the exciter piston 15 is guided in the impact piston, or vice versa. The air enclosed in the pneumatic chamber 19 is compressed and decompressed by the exciter piston 15. The changes in pressure couple the impact piston to the movement of the exciter piston 15, and the pneumatic chamber 19 behaves in a similar manner to a spring, and is therefore also referred to as a pneumatic spring. The exciter piston 15 and the impact piston 16 can be configured as solid cylinders. In other embodiments, the exciter piston 15 can be configured in the form of a cup and the impact piston 16 is guided in the exciter piston 15. Analogously, the exciter piston 15 can be guided in the impact piston 16. The impact piston 16 can strike the tool 3 directly or strike the tool indirectly by way of an anvil 21.

The user exerts a force in the striking direction 22 on the handle 6 in order to press the tool 3 against the wall. The tool 3 is movable along the striking direction 22 in the tool holder 2. The tool 3 is moved counter to the striking direction 22 in the tool holder 2 and in the process moves the anvil 21 until the latter comes to bear against a stop. This position of the anvil 21 is referred to as working position in the following text. In chiseling operation, the impact piston 16 strikes the anvil 21 in the working position thereof. The anvil 21 in the working position defines the running time and the running distance that the impact piston 16 covers between two strikes. The position in which the striker strikes the anvil 21 in the working position is referred to as striking point in the following text.

The pressing force by the user has to be sufficient for the anvil 21 to return into the working position before each next strike. If the user does not exert any pressing force or exerts too little pressing force on the tool 3, the anvil 21 is not pushed back into the working position after a strike. The anvil 21 is now located in an idle-strike position. In this case, the pneumatic impact mechanism 14 is deactivated automatically, in order to avoid damage to the hand-held power tool 1 and injuries to the user. The switch-off is effected by ventilation of the pneumatic chamber 19. The impact piston 16 is no longer coupled to the exciter piston 15, which continues to move, and comes to rest.

Ventilation of the pneumatic chamber 19 can take place through ventilation openings in the guide tube 20. The ventilation openings can be opened and closed for example by a path-controlled valve. A path-controlled valve is based on a lateral surface of the impact piston 16, which, depending on its position, does or does not overlap the ventilation openings. The ventilation openings are closed when the impact piston 16 is ahead of the striking point in the striking direction. The pneumatic chamber 19 is active and the impact piston 16 is coupled to the exciter piston 15. If the impact piston 16 goes beyond the striking point in the striking direction, the ventilation openings are open. The pneumatic chamber 19 is ventilated and thus deactivated. The air moved through the exciter piston 15 can flow in and out via the ventilation openings. The ventilation of the pneumatic chamber 19 can also take place other controlled valves. The ventilation can also take place indirectly or directly by way of the anvil 21.

The impact mechanism 14 is activated again when the user presses the tool 3 against the substrate. The ventilation openings 23 are closed and the impact piston 16 is coupled to the exciter piston 15 again. The problem arises here that the ventilation openings can typically already be closed by a low pressing force. If the impact piston 16 strikes the weakly pressed anvil 21, the impact piston 16 can slide beyond the striking point. The impact mechanism 14 is deactivated again. The user has difficulty gaining control over the hand-held power tool 1.

The hand-held power tool 1 has a sensor system 24 for sensing the pressing force applied by the user. The sensor system 24 is based on an acceleration sensor 25 for sensing an acceleration of the machine housing 8. The acceleration sensor 25 is arranged in the machine housing 8. The arrangement is such that the acceleration sensor 25 can sense accelerations that arise in the impact mechanism 14 preferably in an undamped manner. The acceleration sensor 25 is arranged for example on the impact-mechanism housing 20, for example the guide tube 20 or a component rigidly connected to the guide tube 20. The impact-mechanism housing 20 undergoes acceleration depending on the movement of the impact piston 16, anvil 21 and tool 3, the type of tool 3, the substrate to be worked on and on the behavior of the user, inter alia the pressing force exerted by the user.

Figure 2:
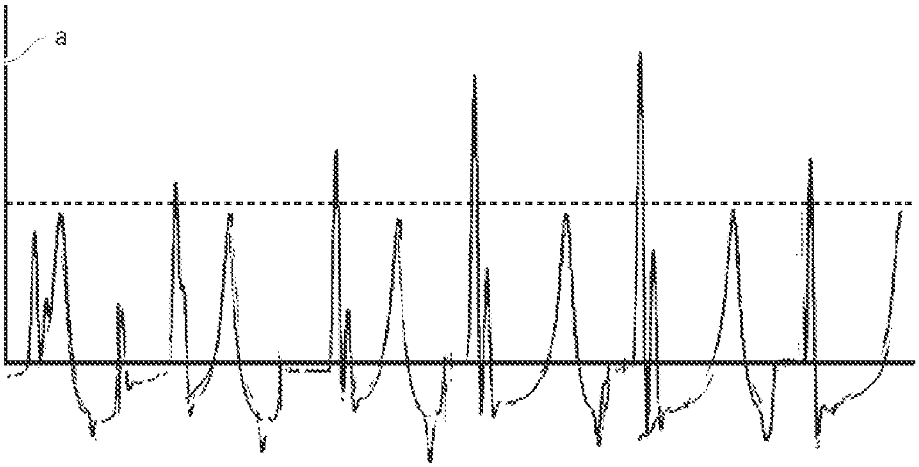
FIG. 2 shows acceleration signals at a low pressing force
Figure 3:
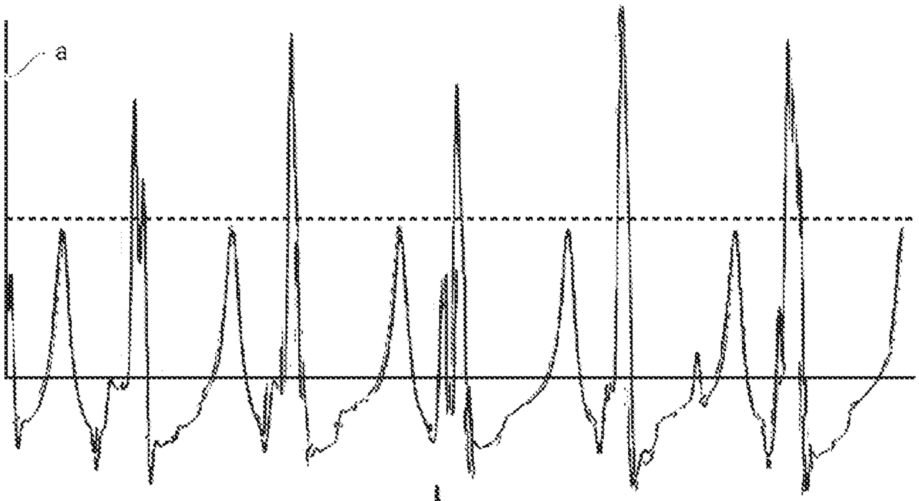
FIG. 3 shows acceleration signals at a medium pressing force
Figure 4:
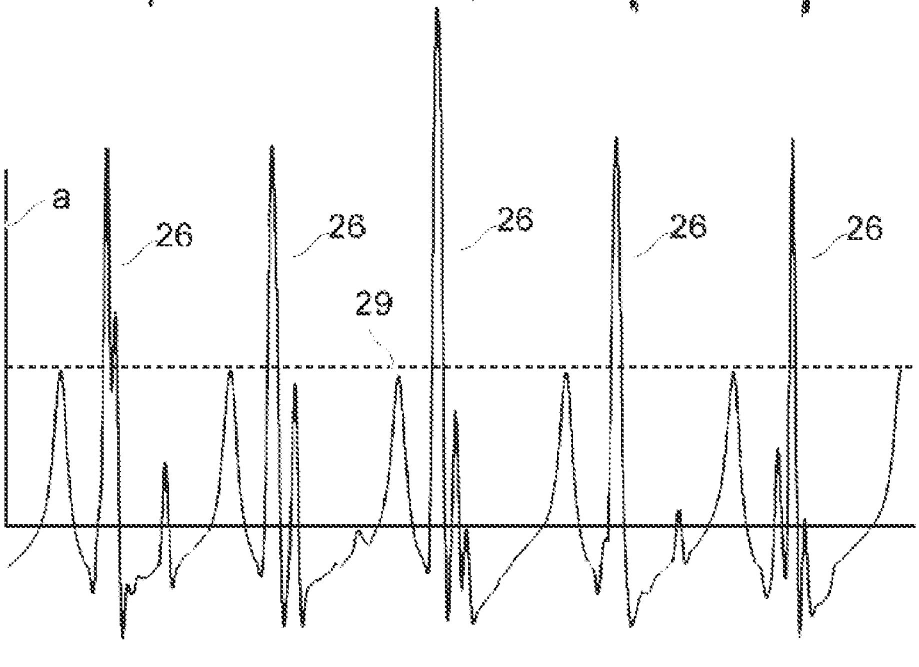
FIG. 4 shows acceleration signals at a high pressing force

FIG. 2, FIG. 3, and FIG. 4 show the profile of the acceleration a as a function of time. In accordance with the periodic movement of the impact piston 16, an approximately periodic behavior of the acceleration is discernible. The amplitude varies from strike to strike, however. This is to be expected on account of the increasingly demolished substrate and the inhomogeneities thereof, and a slightly modified behavior of the user also makes a contribution. Furthermore, the brief and very high accelerations are able to be sensed only with a large tolerance; the accelerations are in the region of 10 times the acceleration due to gravity (dashed line). Therefore, the amplitude is not suitable for reliably determining the pressing force.

The behavior of the acceleration at the time of rebound impact 26 of the anvil 21 proves to be a good indicator of the pressing force. In addition to the amplitude, inter alia the time and the duration until the rebound impact dissipates, i.e. the anvil 21 remains in its working position, are dependent on the pressing force. The influence of the substrate and of the tool on the time and duration of the rebound impact indicates a different behavior than the influence thereof on the amplitude. This makes it possible to distinguish the different influences and to estimate the pressing force.

Test series with the hand-held power tool 1 for different tools, different substrates and different pressing forces were carried out. From the specific acceleration curves for the hand-held power tool 1 and parameters are saved in parameterized form in a table. The table can be stored in a memory 27 in the sensor system 24. The pressing force is can be determined on the basis of from the table and a currently recorded acceleration curve. The acceleration curve is parameterized. For the parameters obtained, the greatest correspondence in the table is determined and the associated pressing force is output.

The sensor system 24 can also contain a sensor 28 for sensing a phase of the exciter piston 15. The strictly periodic movement of the exciter piston 15 dominates the temporal sequence of the movement of the impact piston 16 and of the anvil 21. The impact mechanism 14 has a compression phase 29, when the exciter piston 15 and impact piston 16, at their smallest distance from one another, compress the pneumatic chamber 19. The impact piston 16 exerts the greatest reaction on the exciter piston 15 and thus the impact mechanism housing 20 at this time. Outside this compression phase, the impact piston 16 should, under optimal operating conditions, exert virtually no force on the impact mechanism housing 20. The other peaks of the acceleration are caused substantially by the recoil of the anvil 21 or the impact of the impact piston 16 in damping elements. The evaluation of the acceleration a is based preferably on the peaks outside the compression phase. For this purpose, advantageously by separate determination of the phase of the exciter piston 15, the peaks can be assigned to the different phases or the peaks outside the compression phase are selected for evaluating the pressing force. Furthermore, the knowledge of the current phase is important for precisely determining the time at which a peak, flank or other characteristics of the acceleration a arise(s). A zero point of the time can relate for example to a particular phase of the exciter piston 15, for example the phase of the position, remote from the tool 3, of the exciter piston 15 from the tool 3. An evaluation unit 30 for determining the pressing force can contain a microprocessor or some other data processing device.

The phase of the exciter piston 15 can take place by evaluation of the acceleration over time. However, several cycles and computing power are required for this. Alternatively, a sensor 28 can determine the phase of the exciter piston 15. The sensor 28 can be integrated for example with the exciter piston 15, with the transmission 10 or in the electric motor 13. The sensor 28 is for example an angle sensor, an optical sensor, an electric sensor, etc.

The motor controller or similar control unit 31 of the hand-held power tool 1 reduces the rotational speed of the electric motor 13 when the estimated pressing force is below a setpoint value. The rotational speed can be determined depending on the pressing force. For example, a table is saved in the motor controller 31, which assigns a rotational speed to a pressing force. The assignment can also be saved in the sensor system 24. A reduction in the rotational speed brings about a lower impact force of the impact mechanism 14 and can be kept in operation at a lower pressing force.

The invention claimed is:

1. A method for controlling a hand-held power tool, the method comprising:

driving a pneumatic impact mechanism with an electric motor, wherein an exciter piston of the pneumatic impact mechanism is driven periodically by the electric motor and an impact piston of the pneumatic impact mechanism is coupled to the exciter piston via a pneumatic chamber, sensing an acceleration of a machine housing along a striking direction of the impact piston at different phases in movement of the exciter piston;

estimating a pressing force on a tool of the hand-held power tool on a basis of the sensed acceleration of the machine housing and a phase in the movement of the exciter piston;

determining the pressing force selected from the group consisting of a low pressing force, a medium pressing force, and a high pressing force; and regulating a rotational speed of the electric motor depending on the sensed acceleration at the different phases.

2. A hand-held power tool having a handle, a machine housing, a tool holder in which a tool is guided along a working axis, an electric motor for driving a pneumatic impact mechanism, the pneumatic impact mechanism, which has an exciter piston coupled to the electric motor, an impact piston, and a pneumatic chamber coupling the exciter piston to the impact piston, an acceleration sensor for sensing an acceleration along a working axis of the machine housing, a sensor for sensing a phase of the exciter piston, an evaluation unit for determining a pressing force, selected from the group consisting of a low pressing force, a medium pressing force, and a high pressing force, on the basis of the sensed phase of the exciter piston and the sensed acceleration along the working axis of the machine housing, and a control unit for setting a rotational speed of the electric motor, wherein the control unit sets the rotational speed in response to the pressing force.

* * * * *